United States Patent
Sharma et al.

(10) Patent No.: US 8,948,204 B2
(45) Date of Patent: Feb. 3, 2015

(54) FABRIC CHANNEL CONTROL APPARATUS AND METHOD

(75) Inventors: Neil Sharma, Ithaca, NY (US); Matthew Todd Lawson, Grass Valley, CA (US); Mick R. Jacobs, Auburn, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/758,350

(22) Filed: Apr. 12, 2010

(65) Prior Publication Data

US 2010/0195663 A1 Aug. 5, 2010

Related U.S. Application Data

(63) Continuation of application No. 11/364,303, filed on Feb. 28, 2006, now Pat. No. 7,697,529.

(51) Int. Cl.
*H04L 12/28* (2006.01)
*H04L 12/56* (2006.01)
*H04L 12/935* (2013.01)
*H04L 12/931* (2013.01)

(52) U.S. Cl.
CPC .......... *H04L 49/3072* (2013.01); *H04L 49/357* (2013.01)
USPC .......... 370/474; 370/389; 370/419; 370/366; 370/367; 370/368; 370/395.7; 370/477; 370/536; 370/537; 370/538; 370/539; 370/540; 370/541; 370/542; 370/543; 370/544

(58) Field of Classification Search
None
See application file for complete search history.

(56) References Cited

U.S. PATENT DOCUMENTS

| | | | | |
|---|---|---|---|---|
| 4,964,113 A * | 10/1990 | Geyer et al. | | 370/452 |
| 5,160,929 A * | 11/1992 | Costello | | 341/57 |
| 5,440,550 A * | 8/1995 | Follett | | 370/427 |
| 5,898,692 A * | 4/1999 | Dunning et al. | | 370/427 |
| 6,393,082 B1 * | 5/2002 | Nakamura | | 375/368 |
| 6,529,999 B1 * | 3/2003 | Keller et al. | | 711/141 |
| 6,553,430 B1 * | 4/2003 | Keller | | 710/5 |
| 6,594,275 B1 * | 7/2003 | Schneider | | 370/465 |
| 6,721,333 B1 * | 4/2004 | Milton et al. | | 370/469 |
| 7,016,363 B1 * | 3/2006 | Reed et al. | | 370/404 |
| 7,251,256 B1 * | 7/2007 | Barry et al. | | 370/503 |
| 7,607,069 B1 * | 10/2009 | Cypher et al. | | 714/776 |
| 7,613,110 B1 * | 11/2009 | Blair | | 370/230 |
| 7,889,658 B1 * | 2/2011 | Bauder et al. | | 370/236 |
| 2001/0030971 A1 * | 10/2001 | Moody | | 370/401 |
| 2002/0018444 A1 * | 2/2002 | Cremin et al. | | 370/235 |
| 2002/0112111 A1 * | 8/2002 | Zabinski et al. | | 710/317 |
| 2002/0131425 A1 * | 9/2002 | Shalom | | 370/401 |

(Continued)

OTHER PUBLICATIONS

WO 2006/027672. So et al. System and Method for Adaptive Frame Size Management in a Wireless Multihop Network. Published Mar. 16, 2006. International Filling Date: Sep. 9, 2005.*

*Primary Examiner* — Ayaz Sheikh
*Assistant Examiner* — Peter Chau
(74) *Attorney, Agent, or Firm* — Campbell Stephenson LLP

(57) ABSTRACT

A method for receiving packet data at a communication channel and transmitting the packet data over serial links of the communication channel. The packet data is sliced into n-bit data portions which are concatenated with a header prior to transmitting an n-bit portion across one of the serial links of the communication channel. The header may include an invert bit to alter the majority sign of an n-bit portion. Other aspects of the present invention are also described herein.

10 Claims, 14 Drawing Sheets

(56) References Cited

U.S. PATENT DOCUMENTS

| | | | |
|---|---|---|---|
| 2002/0138224 A1* | 9/2002 | Sessions | 702/107 |
| 2002/0145974 A1* | 10/2002 | Saidi et al. | 370/230 |
| 2003/0016697 A1* | 1/2003 | Jordan | 370/466 |
| 2003/0026218 A1* | 2/2003 | Singhai et al. | 370/316 |
| 2003/0101302 A1* | 5/2003 | Brocco et al. | 710/300 |
| 2003/0123389 A1* | 7/2003 | Russell et al. | 370/230 |
| 2003/0142669 A1* | 7/2003 | Kubota et al. | 370/389 |
| 2003/0210687 A1* | 11/2003 | Nong | 370/389 |
| 2004/0003339 A1* | 1/2004 | Cypher et al. | 714/776 |
| 2004/0179526 A1* | 9/2004 | Cypher | 370/392 |
| 2004/0179527 A1* | 9/2004 | Cypher | 370/392 |
| 2005/0135355 A1* | 6/2005 | Muthukrishnan et al. | 370/389 |
| 2005/0135356 A1* | 6/2005 | Muthukrishnan et al. | 370/389 |
| 2005/0152358 A1* | 7/2005 | Giesberts et al. | 370/389 |
| 2005/0152359 A1* | 7/2005 | Giesberts et al. | 370/389 |
| 2005/0220145 A1* | 10/2005 | Nishibayashi et al. | 370/474 |
| 2006/0078001 A1* | 4/2006 | Chandra et al. | 370/473 |
| 2006/0165098 A1* | 7/2006 | Varma | 370/397 |
| 2007/0153757 A1* | 7/2007 | Kim et al. | 370/338 |
| 2007/0195820 A1* | 8/2007 | So et al. | 370/470 |
| 2010/0155493 A1* | 6/2010 | Russell et al. | 235/492 |

* cited by examiner

| Bits | 0 | 1 | 2 | 3 | 4 | 5 | 6 | 7 |
|---|---|---|---|---|---|---|---|---|
| VD Byte { 0 | 1 | 0 | - | 0 | 1 | 1 | - | - |
| Invert Byte { 1 | INV | INV | INV | INV | INV | INV | INV | INV |
| 9:2 | First Slice Of Packet 1 ||||||||
| 17:10 | Second Slice Of Packet 1 ||||||||
| 25:18 | Third Slice Of Packet 1 ||||||||

Serial Links — B

FIG. 4B

| Bits | 0 | 1 | 2 | 3 | 4 | 5 | 6 | 7 |
|---|---|---|---|---|---|---|---|---|
| VD Byte { 0 | 1 | 0 | - | 0 | 0 | 1 | - | - |
| Invert Byte { 1 | INV | INV | INV | INV | INV | INV | INV | INV |
| 9:2 | Penultimate Slice Of Packet 1 ||||||||
| 17:10 | Final Slice Of Packet 1 ||||||||
| 25:18 | First Slice Of Packet 2 ||||||||

Serial Links — C

FIG. 4C

Frame:

| Bits | 0 | 1 | 2 | 3 | 4 | 5 | 6 | 7 |
|---|---|---|---|---|---|---|---|---|
| 0 | DCS | CCS | Seq[1] | Seq[2] | Seq[3] | Seq[4] | Seq[5] | Seq[6] |
|   |   |   | PS | PB[0] | PB[1] | PB[2] | Q[0] | Q[1] |
|   |   |   | Seq[1] | Seq[2] | Seq[3] | Seq[4] | Seq[5] | Seq[6] |
| 1 | INV | INV | INV | INV | INV | INV | INV | INV |
| 9:2 | CC/Data | CC/Data | CC/Data | CC/Data | CC/Data | CC/Data | CC/Data | CC/Data |
| 17:10 | CC/Data | CC/Data | CC/Data | CC/Data | CC/Data | CC/Data | CC/Data | CC/Data |
| 25:18 | CC/Data | CC/Data | CC/Data | CC/Data | CC/Data | CC/Data | CC/Data | CC/Data |

Invert Byte: row 1. Columns are Serial Links; column 1 header shows Seq[0].

FIG. 6B

| Case | PB | Transfer | Transfer | Transfer |
|---|---|---|---|---|
| I | 3'b000 | $D_{n-2}$ | $D_{n-1}$ | $D_n$ |
| II | 3'b001 | $D_{n-1}$ | $D_n$ | $D_0$ |
| III | 3'b010 | $D_n$ | $D_0$ | $D_1$ |
| IV | 3'b011 | $D_0$ | $D_1$ | $D_2$ |
| V | 3'b100 | $D_{n-1}$ | $D_n$ | NULL |
| VI | 3'b101 | $D_n$ | NULL | NULL |
| VII | 3'b110 | $D_n$ | $D_0$ | NULL |
| Reserved | 3'b111 | Reserved | | |

FIG. 6C

FABRIC CHANNEL CONTROL APPARATUS AND METHOD

CROSS-REFERENCE TO RELATED APPLICATIONS

The present patent application is a continuation of U.S. patent application Ser. No. 11/364,303, filed on Feb. 28, 2006, now U.S. Pat. No. 7,697,529, entitled "Fabric Channel Control Apparatus and Method" and is incorporated by reference herein in its entirety and for all purposes.

TECHNICAL FIELD OF THE INVENTION

This invention relates to channel communication between devices and, more particularly, to apparatus and methods for efficient channel control for communication between devices.

BACKGROUND OF THE INVENTION

Communication channels are employed in many types of communication systems. Communication channels transmit multi-bit data between, for example, a line card and a switching fabric of a switch or a router.

BRIEF DESCRIPTION OF THE DRAWINGS

A better understanding of the present invention can be obtained when the following detailed description of the drawings is considered in conjunction with the following drawings.

FIG. 4B illustrates an exemplary table of bit values that may be set for a frame that holds the first three byte slices of a packet.

FIG. 4C illustrates an exemplary table a bit values that may be set for a frame that holds the last two byte slices of a first packet and the first byte slice of a second packet.

FIG. 6B illustrates an exemplary table that identifies different bit values of a frame.

FIG. 6C illustrates an exemplary table of different bit values and their meanings for packet boundary (PB) bits of the frame.

DESCRIPTION OF EXEMPLARY EMBODIMENTS

The following is intended to provide a detailed description of an example of the invention and should not be taken to be limiting of the invention itself. Rather, any number of variations may fall within the scope of the invention which is defined in the claims following the description.

Figure 1:
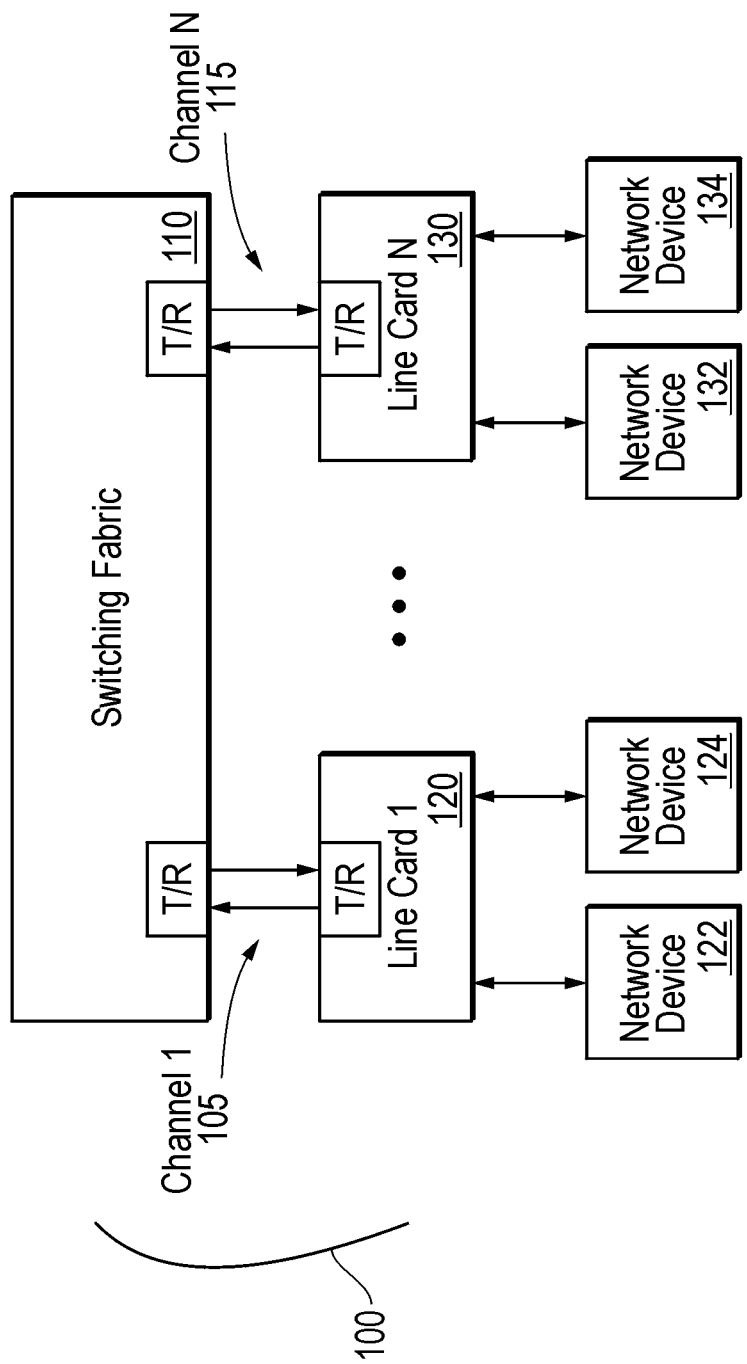
FIG. 1 illustrates an exemplary communication system.

FIG. 1 illustrates a block diagram of a communication system 100. In this example, communication system 100 includes a switching fabric 110 and multiple line cards 120-130. It should be noted that a transmitter/receiver (T/R) is located at either end of the illustrated communication channels of the communication system 100. The communication system 100 connects various devices 122, 124, 132, and 134 to each other. Devices 122, 124, 132, and 134 can, in general, include a variety of different devices including computer systems, output devices, storage devices (e.g., disk arrays), or other communication systems such as routers, switches, etc.

It will be noted that the variable identifier "N" is used in FIG. 1 (and in other parts of this application) to more simply designate the final element (e.g., line card N 130) of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier. In a similar context, the variable "M" appears in other parts of this application and represents the final element in a series of related or similar elements and may hold the same or a different value than the variable "N."

Figure 2:
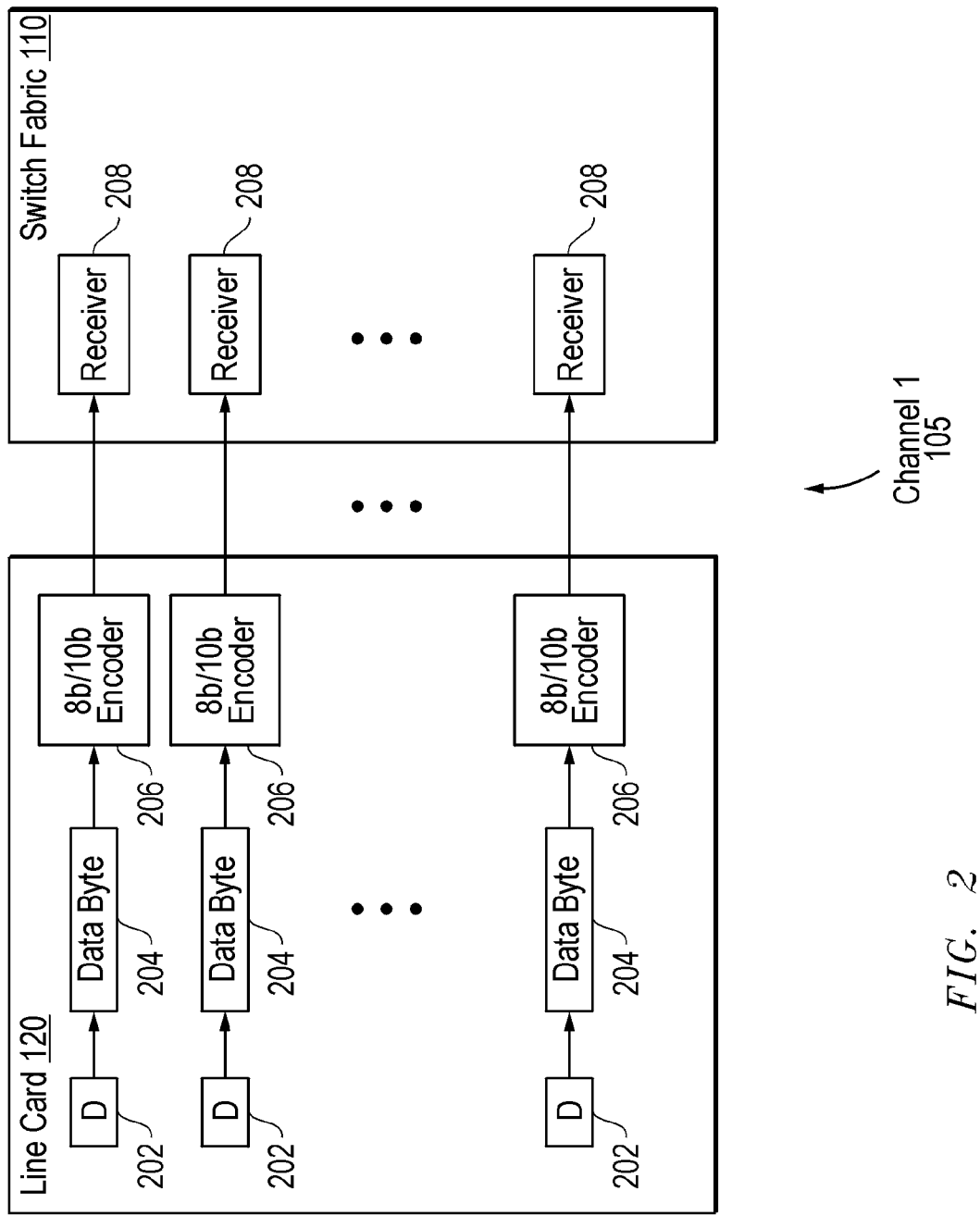
FIG. 2 illustrates an exemplary communication channel.

Communication system 100 can employ one or more of a variety of different communication protocols enabling data communication between devices. For example, communication channels 105-115 may be formed between line cards 120-130 and switching fabric 110, respectively. FIG. 2 illustrates a more detailed view of multi-link communication channel 105 coupled between line card 120 and switching fabric 110 of FIG. 1. Multi-link communication channels often use a protocol known as 8b/10b for transferring data from the line card 120 to the switch fabric 110. To illustrate relevant operating aspects, assume the multi-link communication channel 105 includes eight serial links. If a 72 byte packet were to be transferred across the eight link channel 105, the 72 bytes would be divided into nine slices, each containing eight bytes. Each of the nine slices are transmitted across channel 105 one after the other. The eight bytes of each slice are transmitted at roughly the same time across the eight links, respectively, of channel 105. Before being transmitted, each byte in a slice is encoded using the 8b/10b encoding protocol mentioned above. Moreover, before any slice of a packet is transmitted across the channel 105, a one byte packet delimiter 202 is transmitted simultaneously across each of the eight links. Delimiters can be used to designate the boundaries between packets that are consecutively transmitted between a line card and a switching fabric. The delimiters may contain information about the packets they separate. For example, delimiters may identify the priority of a packet that follows. Unfortunately, the transmission of the delimiters between packets reduces the number of packets that can be transmitted across channel 105 during a given period of time.

8b/10b encoders 206 are provided to avoid run length and/or DC imbalance problems that can arise when too many bits of the same value (e.g., logical one or logical zero) are being consecutively transmitted across a link. Each 8b/10b encoder 206 receives an eight bit delimiter or data byte 204 of a slice that is to be transmitted across a serial link of the communication channel 105. The 8b/10b encoder encodes the eight bit delimiter or data byte to produce a ten bit value before transferring the ten bit value across its respective link of the communication channel 105. This ten bit value is formatted to preclude run length and DC imbalance problems that may arise during transmission across the link. A receiver 208 at the switch fabric 110 converts the encoded ten bit value back into the original eight bit data byte or delimiter, and the channel 105 remains viable during packet transmission. However, because the 8b/10b encoder 206 adds an additional two bits for each eight bit data byte 204 or delimiter that is transferred, over the course of transmission across the channel 105, a 72 byte packet requires an additional 18 bytes to be transmitted across the channel 105 for the packet payload, thus reducing the number of packets that can be transmitted across channel 105 during a given period of time.

Various aspects of the present invention may be realized through a method for receiving packet data at a communication channel and serially transmitting the packet data across at least two serial links of the communication channel. The packet data is formatted into slices of packet data bytes which are concatenated to transmit the packet data bytes across the communication channel. When packet data bytes are on a packet boundary, as described further herein, a virtual delimiter may be set to indicate such packet boundary.

The method may also include generating a first sign bit to represent a sign of the majority of packet data bits to be transmitted across one of the serial links. This first sign bit is compared with a second sign bit that represents a sign of the majority of packet data bits transmitted immediately previous to the bits about to be transmitted on the serial link. An invert bit is set for the serial link according to the comparison of the first sign bit and the second sign bit. If the first sign bit matches the second sign bit, then the invert bit is selected to indicate that bits of the concatenated data bytes of the serial link are to be inverted prior to transmission across the serial link. Otherwise, the invert bit is selected to indicate that bits of the concatenated data bytes are not to be inverted prior to transmission across the serial link. Of note, the invert bit is set prior to transmitting the data bits across the serial link.

Figure 3:
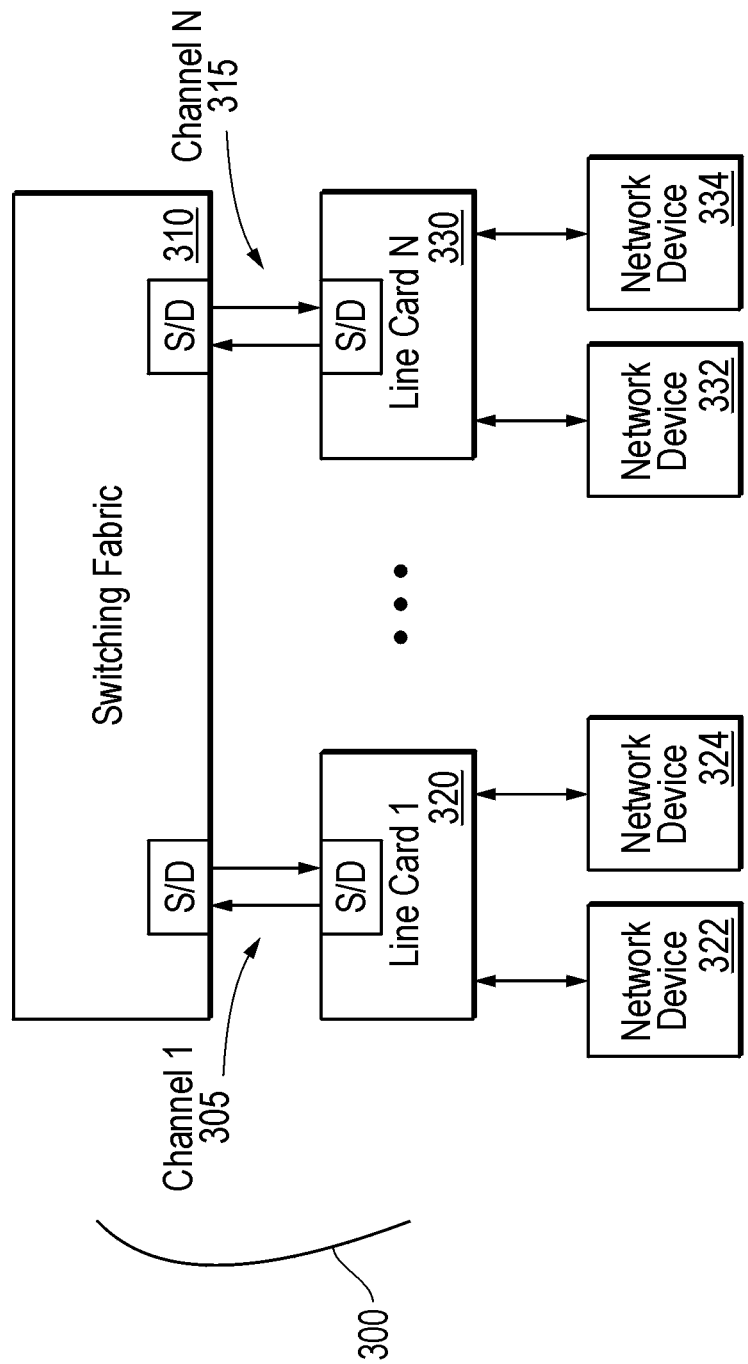
FIG. 3 illustrates exemplary components of a communication system.

FIG. 3 illustrates an exemplary communication system 300 in which one embodiment of the present invention may be employed. Similar to FIG. 1, the communication system 300 includes a switching fabric 310 coupled to multiple line cards 320-330 via respective communication channels. The present invention will be described with reference to communication between a line card and a switching fabric, it being understood that the present invention should not be limited thereto. For example, the present invention could be employed to increase the channel utilization efficiency between a disc controller and a hard disk in a disk array or between a switch and a disk array in a storage area network.

Various devices 322, 324, 332, and 334 communicate with each other through switching fabric 310 and line cards 320-330. Devices 322, 324, 332, and 334 can, in general, include a variety of different devices including computer systems, output devices, storage devices, etc. Communication channels 305-315 may be formed, respectively, between line cards 320-330 and switching fabric 310. Communication system 300 employs a communication protocol that enables data communication between devices 322, 324, 332, and 334 according to principles of one embodiment of the present invention.

In the most general sense, the communication channels 305-315 transport data in the form of packets. Packets typically include header and/or trailer information used, for example, for routing, synchronization, and error control. The header and/or trailer information surrounds packet payload data contained in the packet. As described in greater detail in relation to the embodiment of FIGS. 5 and 6, packets are divided and placed into frames in which some of the frames are designed to include a "virtual delimiter" and/or "invert byte" with a frame payload that is a portion of the packet. The virtual delimiter of a frame can be used to identify the boundaries between packets transmitted across a communication channel such as communication channel 305, while the invert byte can be used to avoid potential run length and/or DC imbalance problems in serial links of the communication channel.

Figure 4A:
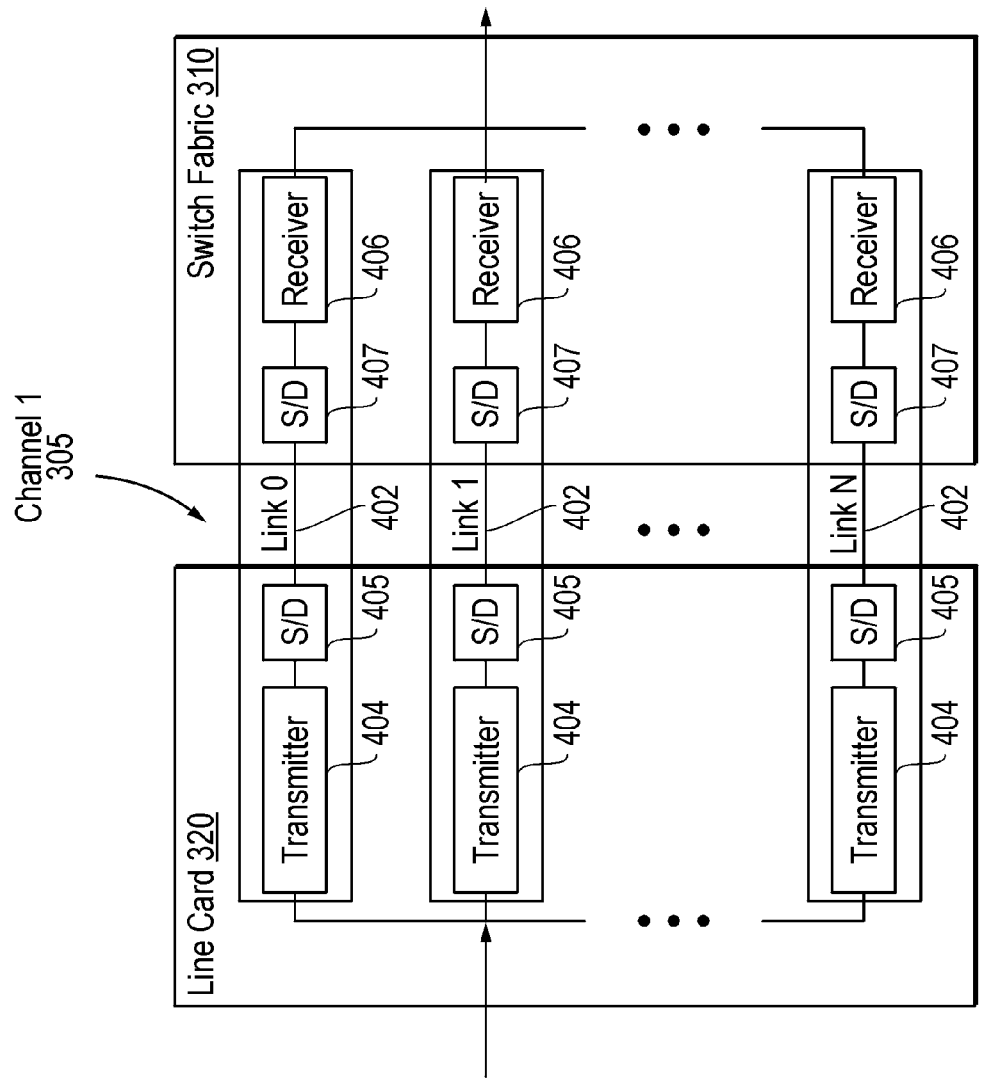
FIG. 4A illustrates an exemplary communication channel.

FIG. 4A is a block diagram showing relevant components of line card 320 and switch fabric 310 of FIG. 3. FIG. 4A also shows a more detailed view of communication channel 305 of FIG. 3. The communication channel 305 includes N serial links 402. For the purposes of explanation only, channel 305 will be described as including eight serial links it being understood that the present invention can be employed with channels having fewer or more than eight serial links. Each serial link 402 couples a transmitter/serdes pair 404, 405 at the line card 320 and a receiver/serdes pair 406, 407 at the switch fabric 310.

As noted, packets of various sizes are sequentially received at the line card 320 of FIG. 4A. Each received packet is divided within the line card 320 into slices, each slice containing eight bytes. Frames are constructed from the eight byte slices of packet data. Each frame contains three slices of packet data and a header. As will be more fully described below, each frame may contain slices of one packet or slices of two consecutively received packets. Each frame header may include an invert byte, more fully described below. Some frames may include a virtual delimiter byte, while other frames may contain an error check code byte. The virtual delimiter byte may identify inter or intra frame boundaries between packets received by line card 320 as will be more fully described below. Virtual delimiters may also identify priority of the packet slices contained in the frame, also more fully described below. For the purposes of explanation only, it will be presumed that each frame header contains an invert byte. Moreover, it will be presumed for the purposes of explanation only that each frame header contains a virtual delimiter byte or an error check code byte.

After a frame is constructed, the frame is transmitted across the eight links of channel 305. More particularly, the eight bits of the virtual delimiter or error check code are transmitted simultaneously across the eight serial links, respectively, to the eight receivers, respectively, on the switch fabric side. Thereafter, the eight bits of the invert byte are transmitted simultaneously across the eight serial links, respectively, to the eight receivers, respectively, on the switch fabric side. Of course, the respective eight bit transmissions may occur in a different order than described herein. The eight bytes of the first slice in the frame payload are serially transmitted across the eight serial links, respectively, to the eight receivers, respectively. The eight bytes of the second slice in the frame payload are then serially transmitted across the eight serial links, respectively, to the eight receivers, respectively. Finally, the eight bytes of the third slice in the frame payload are serially transmitted across the eight serial links, respectively, to the eight receivers, respectively. Accordingly, each serial link transmits one bit of the invert byte, one bit of the virtual delimiter or error check code byte, and one byte of each of the three frame payload slices. The combination of one bit of the invert byte, one bit of the virtual delimiter or error check code byte, and respective bytes of three frame payload slices transmitted over a serial link will be referred to herein as a frame segment. Thus, the eight links of channel 305 transmit eight frame segments, respectively, for each frame transmitted between the line card 320 and switching fabric 310.

As will be more fully described below, the receivers 406 process packet bytes of the segment they receive in accordance with the invert bits they receive. Moreover, the receivers 406 also process the data packets of the frame in accordance with the virtual delimiter byte or the error check code byte as will be more fully described below.

As noted, bytes of a packet are transmitted across each of the serial links 402 of the communication channel 305 in a 26 bit stream of serial data called a "segment." Each segment includes three bytes of a packet and two bits of frame header that is to be transferred over the respective link 402, i.e., three bytes of segment payload and two bits of segment header rather than transferring 30 bits for three bytes of segment payload as with 8b/10b encoders. Thus, when eight segments are transferred across respective serial links 402 of the communication channel 305, 24 bytes of payload may be transferred with two bytes (16 bits) of header.

The eight segments are referred to herein as a frame when collectively transferred across the communication channel 305. The 26 bytes of a frame could be referred to as a two byte frame header and 24 byte frame payload, the 24 byte frame payload representing bytes of one or two packets. If a frame contains the first three slices of a packet or the last three slices of a packet, the frame header should contain a virtual delimiter that indicates that the frame contains the first three or the last three slices of the packet. Further, if the frame contains some other packet boundary arrangement of slices such as the last two slices of a first packet and the first slice of a second packet, the frame header should contain a virtual delimiter that indicates that the first two slices of the frame are from one packet while the last slice is from another packet. For example, FIG. 4B illustrates a 26 byte frame B having a frame header with a virtual delimiter within the frame header that is set to indicate a frame payload holding the first three slices of a packet while FIG. 4C shows a similar frame C having a virtual delimiter set to indicate a frame payload holding the last two slices of a first packet and the first slice of a second packet. In the illustrated examples of FIGS. 4B and 4C, bits 3-5 of the virtual delimiters are set to 011 and 001, respectively. In FIG. 4B, bits 3-5 of the virtual delimiter indicate that the payload of frame B contains the first three slices of a packet, while in FIG. 4C, bit 3-5 of the virtual delimiter are set to indicate that the payload of frame C contains the last two slices of a packet and the first slice of a second packet.

As illustrated, the virtual delimiter of a frame header may indicate the packet boundaries within the frame payload by the setting of the first bit of a number of segment headers. This combination of respective first bits of segment headers is referred to as a virtual delimiter of certain frames because the combination of these bits of the frame header serves the purpose of the packet delimiter described above (and otherwise), but is located within a channel frame. The second header bit of each segment can represent an invert bit to indicate whether the segment bytes of a link are to be inverted at the receiver to avoid run length and other problems described above. These invert bits of the eight link frame form the eight bit invert byte.

Figure 5:
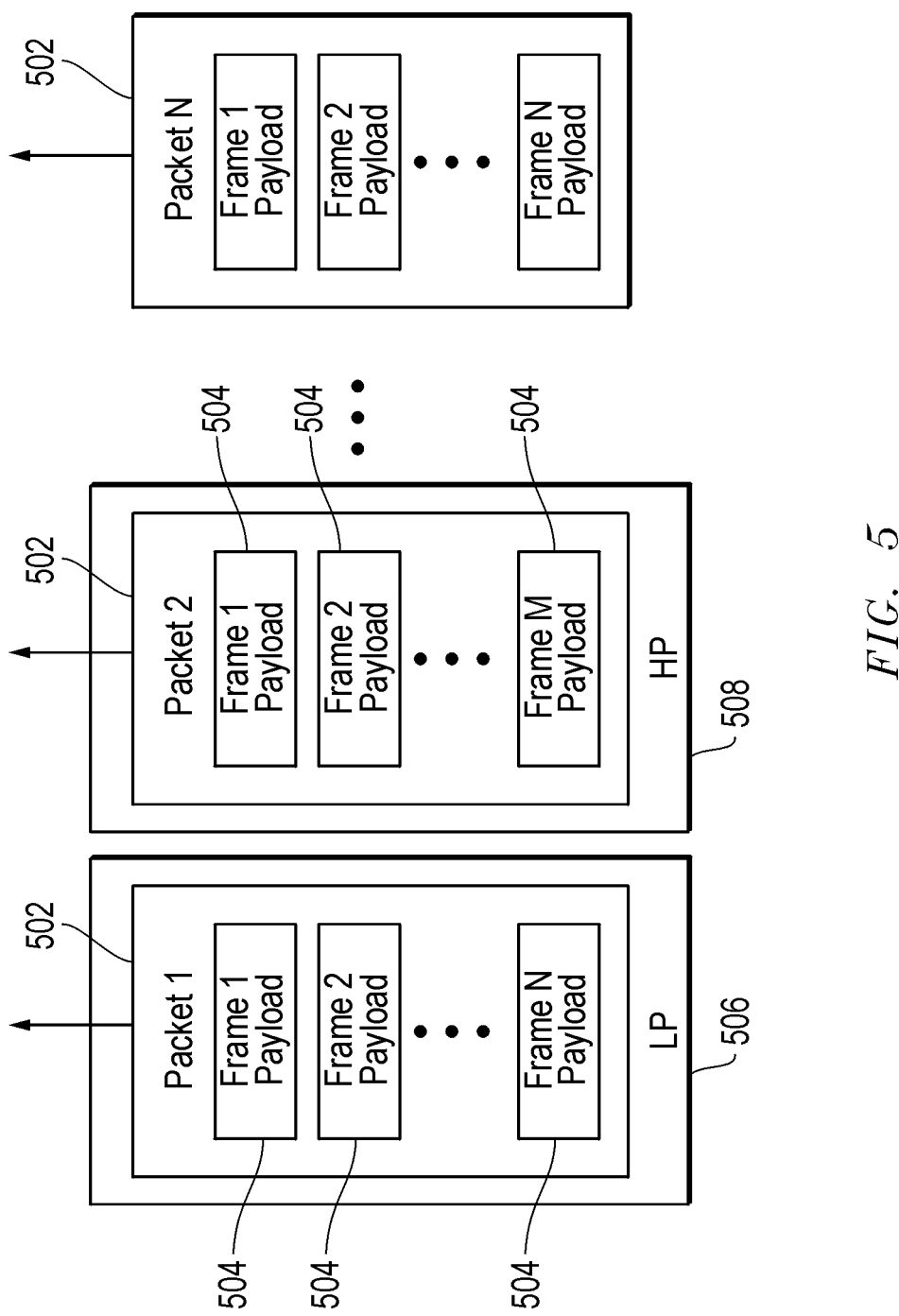
FIG. 5 illustrates exemplary packets.

FIG. 5 is a block diagram illustrating packets 502 that may be sequentially inputted to line card 320 of FIG. 4A for subsequent transfer to, for example, line card 330. Each packet 502 can be divided into a number of frame payloads, e.g., frame payloads 504, that may be sliced for inclusion into segments as described in relation to FIG. 6A. A virtual packet delimiter can be located within one or more of the frames. Advantageously, a virtual packet delimiter within a frame spans links of the communication channel 305 rather than being duplicated and sent on each serial link of the channel 305. Thus, overhead for each packet 502 is reduced and a higher data transmission rate is realized for the available bandwidth on the channel 305 when packets are transmitted via channel frames.

Figure 6A:
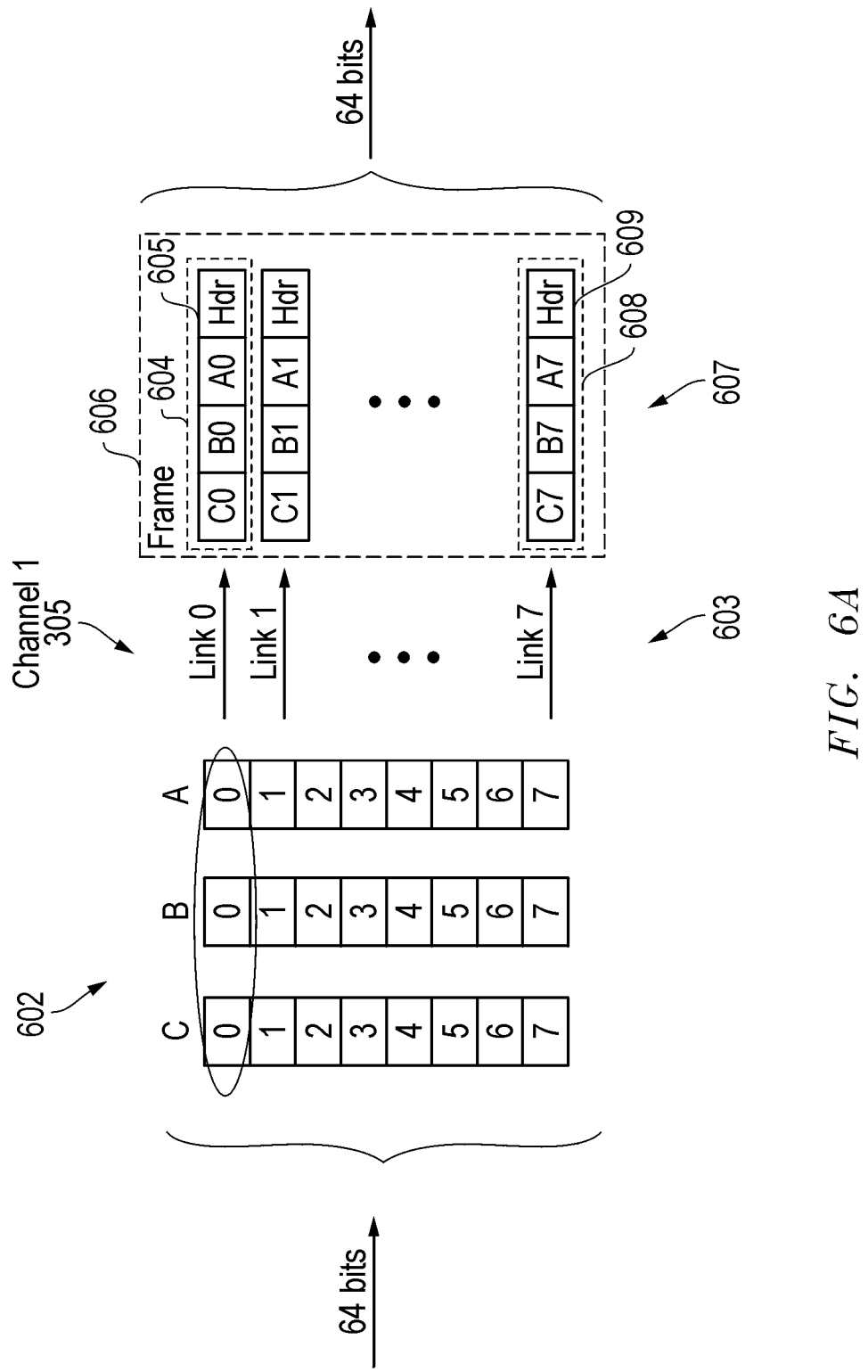
FIG. 6A illustrates exemplary stages of data as the data traverses a communication channel.

FIG. 6A illustrates different data stages as data bits of a packet are received and transmitted across the communication channel 305 within a frame. In a first stage 602, data bits of the packet are separated into bytes of data as illustrated in slices A, B, and C. For example, if the first 64 bits of the packet were received in parallel at point A, the 64 bits could be split into eight bytes of frame payload data, i.e., A0, A1, A2, etc. to A7, represented by slice A. At point B, the next set of 64 bits of the packet could be received and split into another eight bytes of frame payload data, i.e., B0, B1, etc., represented by slice B. Likewise, at point C, the next set of 64 bits of the packet could be received and split into another eight bytes of frame payload data, i.e., C0, C1, etc., represented by slice C. Thus, by appropriately splitting each set of 64 bits of packet data that is received, the three slices, A, B, and C, of the first stage 602 represent 24 bytes of frame payload data.

In a next stage 603, the 24 byte groupings of packet data are transmitted across the links of the communication channel 305 as payload of respective segments of a frame. In the embodiment of FIG. 6A, a byte from each of the three slices A, B, and C is concatenated to form a segment payload as illustrated by segment 604. Segment 604 includes byte 0 from each of slices A, B, and C as well as a segment header (Hdr) 605 that includes two bits of a two byte frame header. The two byte frame header accompanies all bytes of the three slices of frame payload data. The combined segments for each of the links of the communication channel 305 are illustrated in FIG. 6A as frame 606.

Frame 606 represents a third stage 607 for transmitting data bits of the packet. Each segment of frame 606 includes three bytes of segment payload for a total of 24 bytes of payload in the frame 606. Each segment of frame 606 also includes two bits of segment header information for a total of 16 bits or two bytes of header information for the frame 606. In other words, the two bytes of header information spans the eight serial links of the communication channel 305 such that segment 608 may include a different two bit segment header 609 than the segment header 605 of segment 604.

FIG. 6B shows frame variables of a frame in one embodiment of the eight link communication channel 305. Each of columns 0-7 represents a 26 bit frame segment that is to be transmitted across a respective link of the communication channel 305. The first two bits (0 and 1) of each segment represent the segment header of each link while the remaining bits (2 through 25) represent the segment payload of each link. The DCS bit (i.e., the first bit of the first segment header in the first segment) indicates whether the payload of the frame represented by segments 0-7 is data or control information. Different meanings for the first bit of the remaining segment headers depend on the bit state of the DCS bit. For example, if the DCS bit is set to logical 0, the frame payload is solely packet data, and the first bit of the remaining segment headers contain error check code bits (indicated by Seq[0] Seq[6]) that can be used for error checking of the frame payload data once received at the receivers of the switch fabric. On the other hand, if the DCS bit is set to logical 1, and the first bit of the second segment header is set to logical 0, the frame contains a virtual delimiter, and the first bit of the remaining segment headers may be used to indicate the bits of the virtual packet delimiter. With the DCS bit set to logical 1 and the first bit of the second segment header set to logical 1, the frame contains pure control data for internal use within, for example, the switching fabric. Further, with the DCS bit set to logical 1 and the first bit of the second segment header set to logical 1, the first bits of the remaining segment headers contain error check code bits (indicated by Seq[1]-Seq[6] for the pure control data.

The virtual packet delimiter of the frame table illustrated in FIG. 6B may be considered to be a collection of respective 0 bits (first bit) from each of links 2-7. As illustrated, the 0 bit of segment 2 is a packet separator (PS) bit that indicates whether the frame payload includes a packet boundary or whether packet preemption codes are currently selected. The respective 0 bits of segments 3-5 represent packet boundary (PB) bits that may be set to identify which slice of bits in the frame represents the end or beginning of a packet. FIG. 6C is a table showing seven different cases for settings of the three PB bits of the virtual delimiter. For example, case IV represents the example of FIG. 4B in which the PB bits are set to 011 and the slices of the frame are the first three slices of a packet. The transfer of each of the first three eight bit slices of a packet is represented by $D_0$, $D_1$, and $D_2$, respectively. Case II represents the example of FIG. 4C in which the PB bits are set to 001 and the slices are the last two slices of a first packet, $D_{n-1}$ and $D_n$, and the first slice of a second packet, $D_0$. Of course, other arrangements for the PB bits are contemplated as illustrated by the remaining example cases of the table of FIG. 6C.

The virtual delimiter of FIG. 6B also includes a Q bit in each of segments 6 and 7. The Q bits may be set to represent the priority of the current frame. For example, a setting of 00 could be used to indicate a low priority payload while a setting of 01 could be used to indicate a higher priority payload. In the event that the DCS bit is set to logical 0, and the first bit of the second segment header is set to indicate that the frame does not contain a virtual delimiter, the remaining first bit of the remaining segment headers (segments 2-7) may be used to contain error check code bits (indicated by Seq[1]-Seq[6]) that can be used for error checking of the frame payload data once received at the receivers of the switch fabric.

Also illustrated in FIG. 6B, a second bit of the segment headers for each segment of the frame may be used to assure that the run length and DC balance of a channel link remains within specified limits as the segment is transferred on the link. To avoid potential problems in these areas, each time a segment is to be transferred across a serial link, the payload bits of the segment to be transferred are generally compared to the payload bits of the segment previously sent on the same serial link. If the payload bits of the segment to be sent would have a potential adverse DC balance or run length affect on the serial link because too many bits of the same sign are about to be sent across the link, the second bit of the segment header of the problem segment is set to indicate that all bits of the segment are to be inverted prior to being transferred across the link. For this reason, the second bit of a segment header is referred to as an invert bit and is represented by INV in the table of FIG. 6B.

The invert bit may be used to avoid potential problems that would be encountered by the predominance of a certain sign of bit being transferred across the serial link. Thus, run length and DC balance problems are avoided on serial links of the communication channel 305 by a single invert bit of a segment header that is transferred across the communication channel 305. When considered in view a frame, the invert bits are sometimes collectively referred to herein as an invert byte. After segments are transferred across links of the communication channel 305, the receiver 406 (see FIG. 4A) uses the invert bit of each segment to determine whether to re-invert the payload data of the segment before continuing to transfer the payload data.

In a preferred embodiment, both the invert byte and the virtual delimiter are added to certain frames. However, as will be appreciated by those of ordinary skill in the art upon viewing the present disclosure, principles of the present invention may be realized by forming frames with only an invert byte or with only the virtual delimiter.

Figure 7:
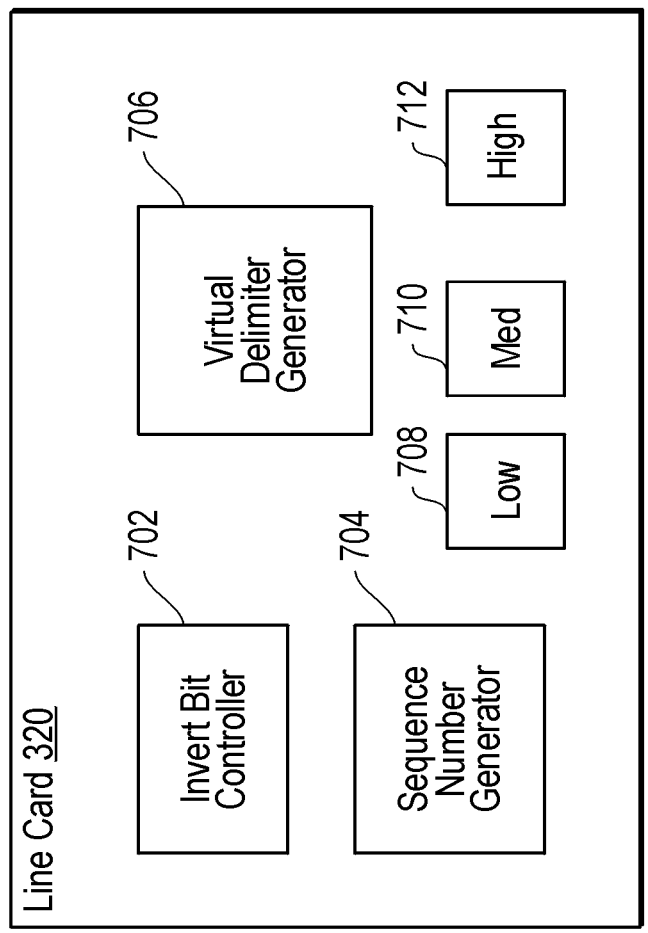
FIG. 7 illustrates exemplary aspects of the line card in FIG. 3.

In the first stage 602 of FIG. 6A, in a preferred embodiment, a line card performs concatenations of packet byte slices and frame header to form the segments of frame 606. FIG. 7 is a block diagram illustrating certain but not other aspects of one embodiment of the line card 320 of FIG. 4. In FIG. 7, line card 320 is illustrated with an invert bit controller 702 for setting the invert bit of a segment and inverting the segment data payload if need be prior to transferring the segment across a link. Also illustrated is a sequence number generator 704 that is used to generate sequence bits that are each placed as the first bit in a number of respective segment headers of a frame such that the respective segment header bits may serve in an error checking capacity for the frame.

A virtual delimiter generator 706 is illustrated for generating packet control information within select frames. The packet control information includes information such as packet boundary information that is identified by frame header bits PB[0]-PB[2] as described with relation to FIG. 6B. The virtual delimiter generator 706 also interacts with packet priority data queues such as low priority queue 708, medium priority queue 710, and high priority queue 712. In this manner, the virtual delimiter generator 706 is able to track packet priorities and generate delimiters for only the appropriately prioritized packets. For example, as illustrated in FIG. 5, packet 506 is a low priority (LP) packet. An LP packet is a packet that may have its transmission on the communication channel 305 interrupted, or stopped, by a higher priority packet taking over the communication channel 305. For example, LP packet 506 may be interrupted by high priority (HP) packet 508 because HP packet 508 has a higher priority than LP packet 506. In the illustrated embodiment, virtual delimiter generator 706 will not generate delimiters for packets from the low or medium priority queues 708 and 710 if packets arrive from the high priority queue 712. Likewise, virtual delimiter generator 706 will not generate a delimiter for a packet from the low priority queue 708, but give priority to packets from either the medium or high priority queues 710 and 712. Of course, line card 320 could be configured to operate with a greater or lesser number of priority queues.

Figure 8:
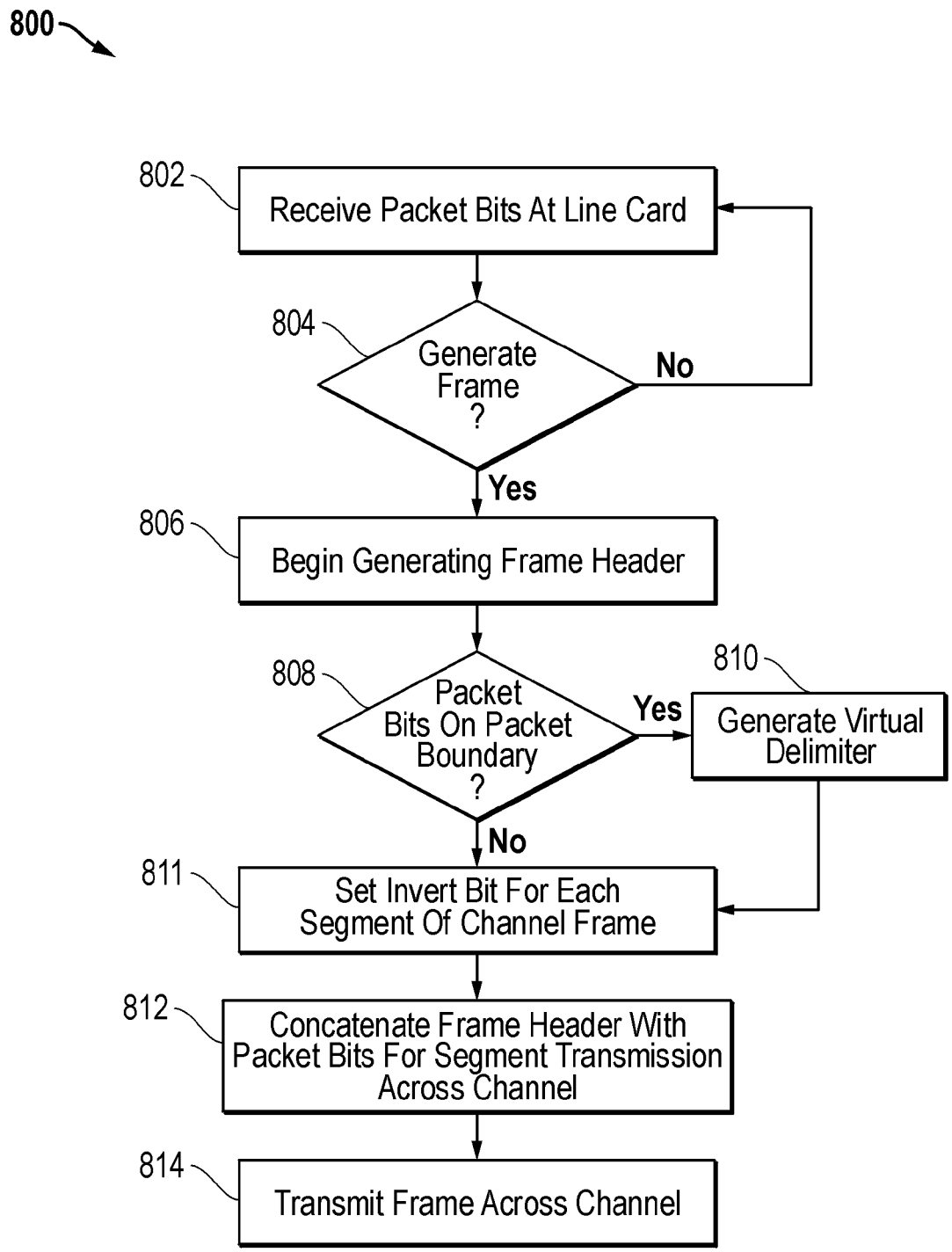
FIG. 8 illustrates exemplary bit transmission across the communication channel.

FIG. 8 illustrates a flow diagram 800 which shows relevant operations performed by a line card, such as line card 320 of FIG. 3, in response to receiving a packet for transmission to switching fabric 310, also of FIG. 3. Process block 802 shows packet bits being received at a line card for transmission across a communication channel such as the communication channel 305 of FIG. 3, connected between the line card 320 and the switching fabric 310. In process block 804, a decision is made as to whether a frame may be generated from the packet bits that have been received at the line card 320. If a frame cannot be generated, then the process returns to process block 802 where more packet bits are received at the line card 320. Otherwise, as illustrated at process block 806, a generation of a frame header is begun. As described above, a frame header may include a number of different types of bits such as sequence bits for error checking capabilities, invert bits for run length and DC bias corrections, and a virtual delimiter to identify things such as a packet boundary.

Figure 9:
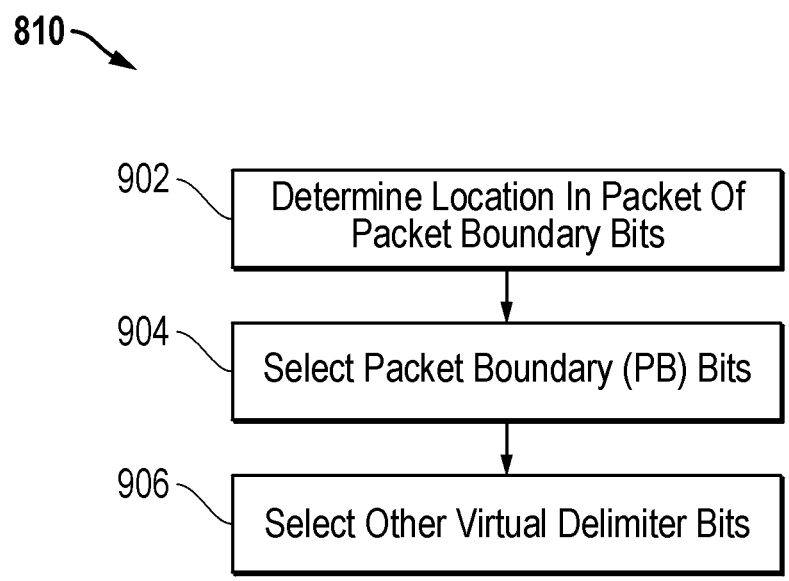
FIG. 9 illustrates an example method for generating a virtual delimiter.

To generate a frame header as indicated at process block 806, decision block 808 first determines whether packet bits are on a packet boundary. If the packet bits are on a packet boundary, a virtual delimiter is generated at process block 810 that will become part of the frame header. As discussed above, this virtual delimiter is intended to indicate which slices of a packet are included in the frame, e.g., as illustrated by the virtual delimiter of FIGS. 4B and 4C or by the virtual delimiters listed in the table of FIG. 6C. FIG. 9 provides a more detailed description of generating the virtual delimiter according to the embodiment of FIG. 8.

Whether a virtual delimiter is to be generated or not, process block 811 of FIG. 8 illustrates setting an invert bit for each segment of a channel frame that is to be transmitted across a communication channel such as the communication channel 305 of FIG. 4A. An invert bit for each of the segments of a channel frame forms an invert byte that is to be transmitted in the frame similar to the frame of FIGS. 5 and 6. When payload bits of a segment are about to be transmitted across a link of a communication channel, if a segment's payload bits would have a potential adverse run length or DC bias affect on the respective serial link because too many bits of the same sign are about to be sent across the link, an invert bit is set to indicate that the bits of that segment are to be inverted. The invert bit for that segment causes all bits of the segment payload to be inverted prior to being transmitted across the link. Thus, inverting segment payload bits prior to transmission over a link is used to avoid potential problems concerning the predominance of a certain sign of bit being transmitted across the serial link. The process is described in greater detail with regard to the flow chart of FIG. 10.

Process block 812 shows concatenating a frame header with segment payloads of a frame. For each segment payload, the frame header includes an invert bit and may include a virtual delimiter bit to form a segment in anticipation of transmitting a frame across the communication channel. Of course, for each link of the communication channel, respective segment payload bytes from each 64 bit slice of packet payload data is concatenated with the corresponding packet payload byte of another 64 bit slice. This concatenation of data bytes with an invert bit, and possibly with a virtual delimiter bit, is what creates a segment for transmission across a link of the communication channel. The segments are each transmitted across a link of the channel at process block 814. It should be noted that in one embodiment, the concatenation of bits may include concatenating only the data and virtual delimiter bit without the invert bit, while in another embodiment, the concatenation may include concatenating only the data and invert bit without the virtual delimiter bit.

FIG. 9 is a flow diagram showing more details regarding the virtual delimiter generation of process block 810 of FIG. 8. Process block 902 illustrates determining the location of packet boundary bits within the packet that is to be transmitted. For example, if the packet slices are the first three slices of a new packet, the PB bits of the virtual delimiter will be set to 011 as illustrated in FIG. 4B and as shown in case IV of the table of FIG. 6C. Process block 904 illustrate selecting the PB bits according to the location of the slices relative to the packet(s) being sliced. In one embodiment, this entails dividing 64 bits into 8 bytes, i.e., one byte per serial link of a communication channel. The 64 bits could be used to form eight bytes of a frame. Process block 906 shows determining the setting for other bits of the virtual delimiter such as the PS bit and Q bits as described above.

Each of the three packet boundary bits could appear in different segment headers of a frame header to form a portion of the virtual delimiter for a frame. In one embodiment, if the bits of the virtual delimiter were set to 000, then the frame payload would hold the last 24 bytes of a packet. If the bits of the virtual delimiter were set to 011, then the frame payload would hold the first 24 bytes of a packet. Other bit settings could also be used to represent different byte configurations in a frame such as the last 16 bytes of a first packet and the first eight bytes of a second packet. Those of ordinary skill in the art will appreciate the numerous possibilities for the virtual delimiter when viewing the present disclosure.

Figure 10:
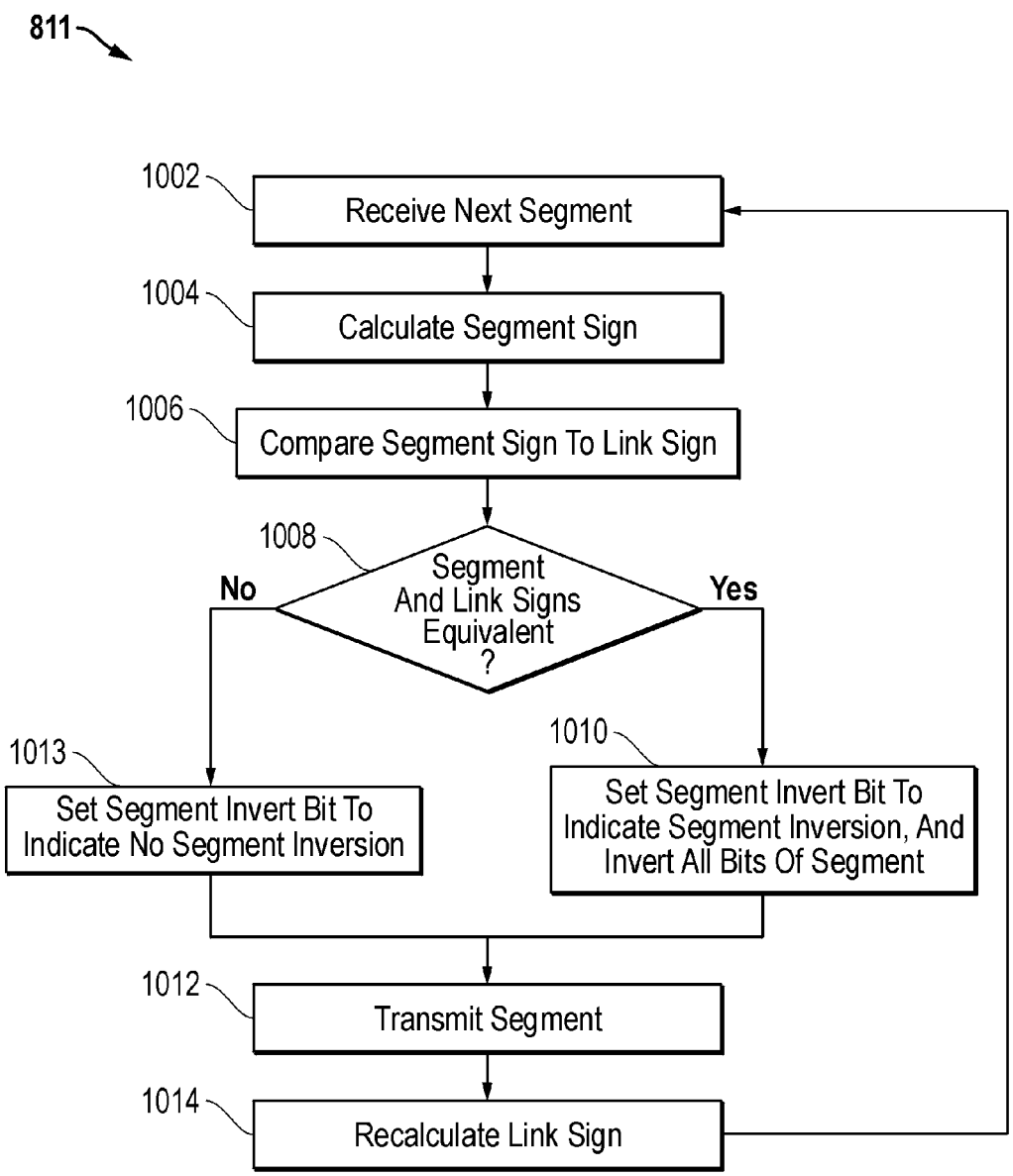
FIG. 10 illustrates an example method for setting an invert bit.

FIG. 10 expands on the invert bit description of process block 811 from FIG. 8. As described in more detail with relation to FIG. 10, the invert bit is used to keep the average sign of bits that are transferred on a link relatively equal. In other words, the invert bit is used to avoid problems with run length and DC imbalance by causing the average sign of segment bits to remain approximately unchanged.

At process block 1002, possibly before concatenating the byte slices, newly received bytes are assigned to a link segment such as one of the link segments in the frame 606 of FIG. 6. Process block 1004 illustrates determining a segment sign for a majority of bits that are assigned to the link segment. Regarding the link intended to be used for the transfer of the assigned link segment bits, process block 1006 illustrates comparing a link sign with the segment sign. A link sign is a bit that represents the majority of bits that were transferred on the link in the immediately proceeding segment.

Diamond 1008 represents the different actions that may be taken depending on whether the segment and link signs are the same. If the segment and link signs are the same, as illustrated in process block 1010, a segment invert bit is set to indicate that bytes of a segment should be inverted prior to being transmitted across the link at process block 1012. On the other hand, if the segment and link signs are not the same, the segment invert bit is set to indicate that bits of the segment are not inverted prior to transmission across the link as indicated by process block 1013. Regardless of the invert bit setting, once the invert bit is set, the segment is transmitted as illustrated in process block 1012. After the segment is transmitted, process block 1014 shows the link sign being recalculated to account for the average sign of the bits that were transmitted across the link. In this manner, the bits of a link can remain relatively balanced as to sign from segment to segment.

Figure 11:
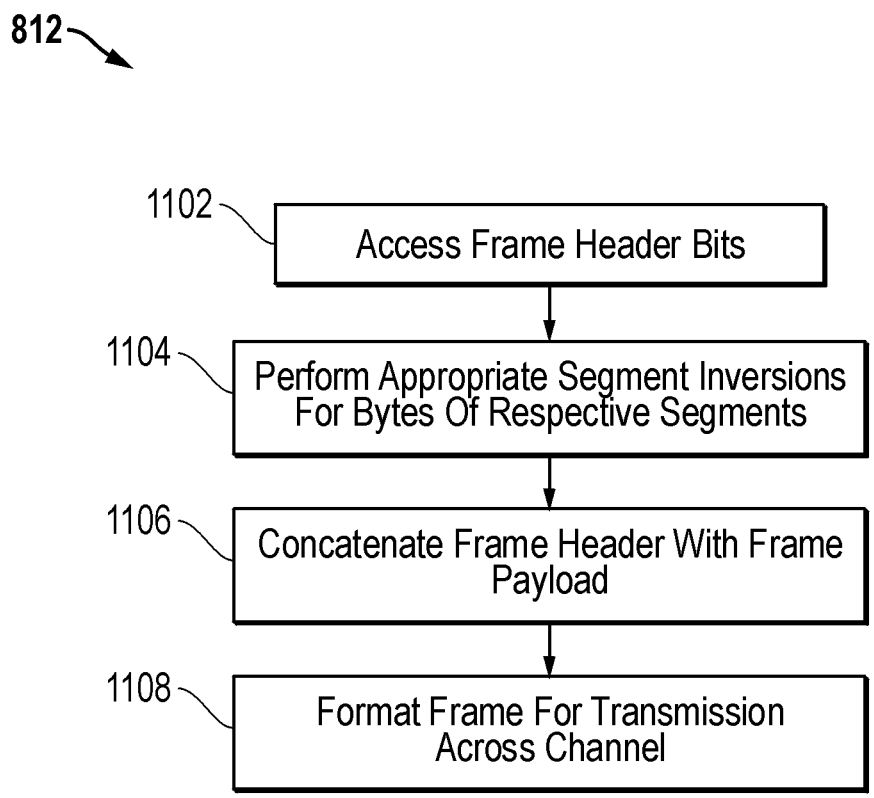
FIG. 11 illustrates an example method for bit concatenation.

FIG. 11 illustrates one embodiment for concatenating bits to form a frame that is to be transmitted across a channel. FIG. 11 may be considered to be an expansion of process block 812 of FIG. 8. Process block 1102 of FIG. 11 illustrates accessing frame header bits that are to be concatenated with packet payload bytes that will be used to form a frame payload. The frame header bits are bits such as the virtual delimiter bits, invert bits, and/or sequence bits that were generated and set as discussed with relation to FIGS. 8, 9, and 10. Process block 1104 illustrates performing segment inversions according to the invert bit for each segment, but it should be noted that the segment inversion could occur before or after a segment is concatenated. Process block 1106 illustrates concatenating the frame header with the frame payload to form respective segments of a frame. Of note, the concatenation of a segment could include concatenating segment payload with only a single bit of a frame header such as a segment invert bit or segment delimiter bit. The frame is then formatted for transmission across a channel as depicted in process block 1108. Once a frame is formatted for transmission across the channel, the frame is transmitted across the channel as shown in process block 814 of FIG. 8.

Figure 12:
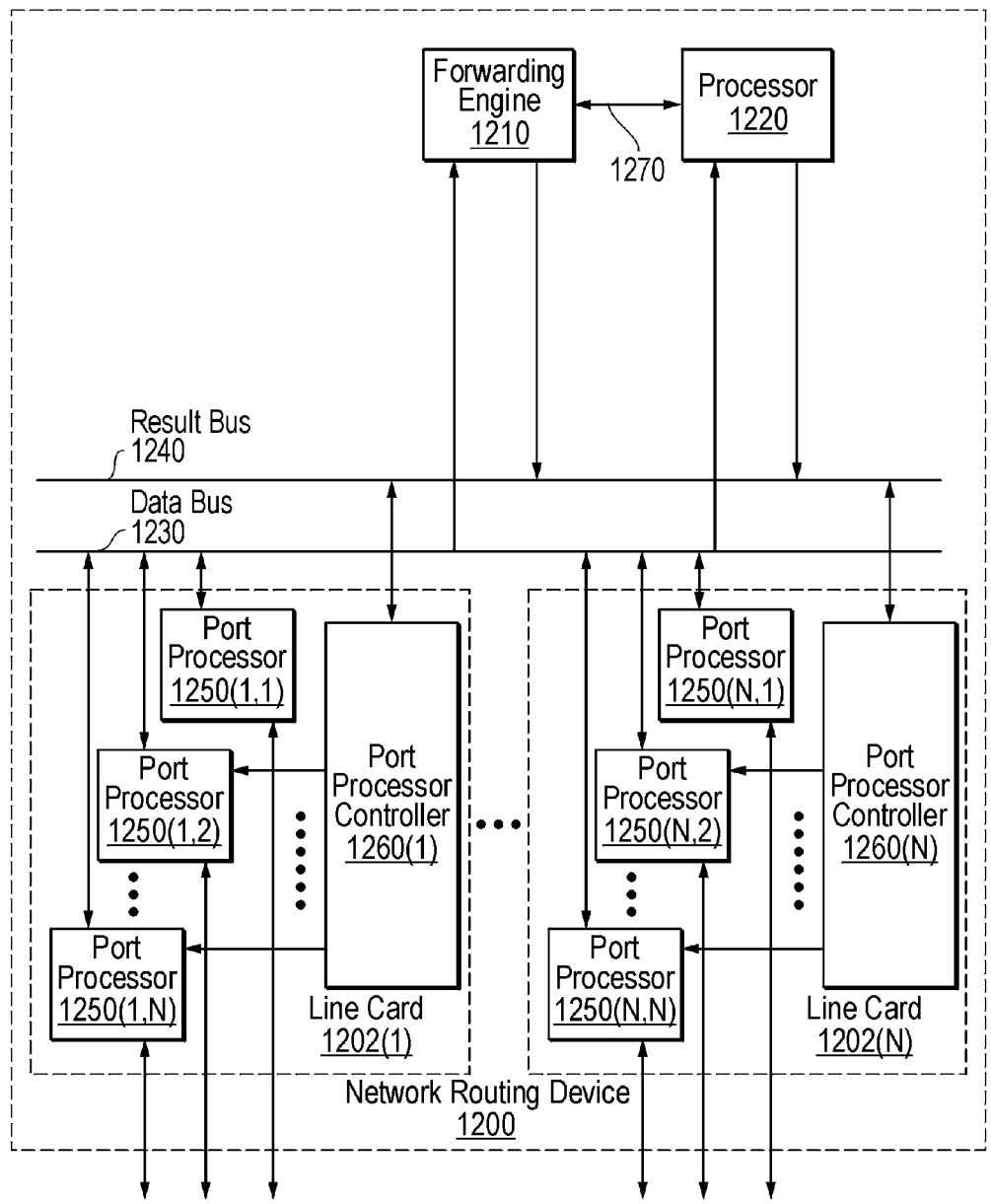
FIG. 12 illustrates exemplary components of a router.

FIG. 12 is a block diagram showing an example of relevant components of a network routing device 1200 appropriate for implementing embodiments of the present invention in which the present invention may be used. In this depiction, network routing device 1200 includes a number of line cards (line cards 1202(1)-(N)) that are communicatively coupled to a forwarding engine 1210 and a processor 1220 via a data bus 1230 and a result bus 1240. Line cards 1202(1)-(N) include a number of port processors 1250(1,1)-(N,N) which are controlled by port processor controllers 1260(1)-(N). It will also be noted that forwarding engine 1210 and processor 1220 are not only coupled to one another via data bus 1230 and result bus 1240, but are also communicatively coupled to one another by a communications link 1270.

When a packet is received, the packet is identified and analyzed by a network routing device such as network routing device 1200 in the following manner, according to embodiments of the present invention. Upon receipt, a packet (or some or all of its control information) is sent from the one of port processors 1250(1,1)-(N,N) at which the packet was received to one or more of those devices coupled to data bus 1230 (e.g., others of port processors 1250(1,1)-(N,N), forwarding engine 1210 and/or processor 1220). Handling of the packet can be determined, for example, by forwarding engine 1210. For example, forwarding engine 1210 may determine that the packet should be forwarded to one or more of port processors 1250(1,1)-(N,N). This can be accomplished by indicating to corresponding one(s) of port processor controllers 1260(1)-(N) that the copy of the packet held in the given one(s) of port processors 1250(1,1)-(N,N) should be forwarded to the appropriate one of port processors 1250(1,1)-(N,N).

In the foregoing process, network security information can be included in a frame sourced by network routing device 1200 in a number of ways. For example, forwarding engine 1210 can be used to detect the need for the inclusion of network security information in the packet, and processor 1220 can be called into service to provide the requisite network security information. This network security information can be included in the packet during the transfer of the packet's contents from one of port processors 1250(1,1)-(N,N) to another of port processors 1250(1,1)-(N,N), by processor 1220 providing the requisite information directly, or via forwarding engine 1210, for example. The assembled packet at the receiving one of port processors 1250(1,1)-(N,N) can thus be made to contain the requisite network security information.

In addition, or alternatively, once a packet has been identified for processing according to the present invention, forwarding engine 1210, processor 1220 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
sequentially receiving first and second data packets;
dividing the first data packet into first X-bit slices;
dividing the second data packet into second X-bit slices;
generating a first delimiter comprising X bits, wherein X is an integer greater than one;
generating a first frame that comprises the first delimiter and a last x-bit slice of the first X-bit slices and a first x-bit slice of the second X-bit slices, wherein Y bits of the first delimiter indicate the first frame comprises data from two data packets, wherein Y is an integer greater than zero and less than X;
transmitting the first frame to a switching fabric via X serial wire communication links, wherein the transmitting the first frame comprises:
concurrently transmitting the X bits of the first delimiter via the X serial wire communication links, respectively;
after transmitting the X bits of the first delimiter, concurrently transmitting data bits of the last x-bit slice of the first X-bit slices via the X serial wire communication links, respectively;
after transmitting the data bits of the last x-bit slice of the first X-bit slices, concurrently transmitting data bits of the first x-bit slice of the second X-bit slices via the X serial wire communication links, respectively;
wherein no data is transmitted over the X serial wire communication links between the transmission of the data bits of the last x-bit slice of the first X-bit slices and the transmission of the data bits of the first x-bit slice of the second X-bit slices.

2. The method of claim 1 wherein the first frame contains two slices of the first X-bit slices and one slice of the second X-bit slices.

3. The method of claim 2 wherein the Y bits indicate the first frame contains two slices of the first X-bit slices and one slice of the second X-bit slices.

4. The method of claim 1 wherein the first frame contains two of the second X-bit slices and one of the first X-bit slices.

5. The method of claim 4 wherein the Y bits indicate the first frame contains two slices of the second X-bit slices and one slice of the first X-bit slices.

6. An apparatus comprising:
an input port configured to sequentially receive first and second data packets;
a circuit coupled to the input port and configured to:
divide the first data packet into first X-bit slices;
divide the second data packet into second X-bit slices;
generate a first delimiter comprising X bits, wherein X is an integer greater than one;
generate a first frame that comprises the first delimiter and a last x-bit slice of the first X-bit slices and a first x-bit slice of the second X-bit slices, wherein Y bits of the first delimiter indicate the first frame comprises data from two data packets, wherein Y is an integer greater than zero and less than X;
transmit the first frame to a switching fabric via X serial wire communication links, wherein the transmission of the first frame comprises:
concurrently transmit the X bits of the first delimiter via the X serial wire communication links, respectively;
concurrently transmit data bits of the last x-bit slice of the first X-bit slices via the X serial wire communication links, respectively, after transmitting the X bits of the first delimiter;
concurrently transmit data bits of the first x-bit slice of the second X-bit slices via the X serial wire communication links, respectively, after transmitting the data bits of the last x-bit slice of the first X-bit slices;

wherein the circuit is configured to transmit no data over the X serial wire communication links between the transmission of the data bits of the last x-bit slice of the first X-bit slices and the transmission of the data bits of the first x-bit slice of the second X-bit slices.

7. The apparatus of claim 6 wherein the first frame contains two slices of the first X-bit slices and one slice of the second X-bit slices.

8. The apparatus of claim 7 wherein the Y bits indicate the first frame contains two slices of the first X-bit slices and one slice of the second X-bit slices.

9. The apparatus of claim 6 wherein the first frame contains two slices of the second X-bit slices and one slice of the first X-bit slices.

10. The apparatus of claim 9 wherein the Y bits indicate the first frame contains two slices of the second X-bit slices and one slice of the first X-bit slices.

* * * * *